US011856119B2

(12) United States Patent
Shang

(10) Patent No.: US 11,856,119 B2
(45) Date of Patent: Dec. 26, 2023

(54) SYNCHRONIZING MECHANISM OF HINGE OF INFOLDING FLEXIBLE SCREEN OF MOBILE TERMINAL

(71) Applicant: HANGZHOU AMPHENOL PHOENIX TELECOM PARTS CO., LTD., Zhejiang (CN)

(72) Inventor: Xiaowei Shang, Zhejiang (CN)

(73) Assignee: HANGZHOU AMPHENOL PHOENIX TELECOM PARTS CO., LTD., Zhejiang (CN)

(*) Notice: Subject to any disclaimer, the term of this patent is extended or adjusted under 35 U.S.C. 154(b) by 335 days.

(21) Appl. No.: 17/423,354

(22) PCT Filed: Jan. 9, 2020

(86) PCT No.: PCT/CN2020/071045
§ 371 (c)(1),
(2) Date: Jul. 15, 2021

(87) PCT Pub. No.: WO2020/147633
PCT Pub. Date: Jul. 23, 2020

(65) Prior Publication Data

US 2022/0086265 A1 Mar. 17, 2022

(30) Foreign Application Priority Data

Jan. 15, 2019 (CN) ......................... 201920060389.7

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .......................... H04M 1/0216; H04M 1/0268
(Continued)

(56) References Cited

U.S. PATENT DOCUMENTS 6,785,935 B2 * 9/2004 Ahn .................... H04M 1/0264 16/221
7,093,702 B2 * 8/2006 Takumori .............. G06F 1/1616 192/16

(Continued)

FOREIGN PATENT DOCUMENTS

CN 105179459 A 12/2015
CN 206206387 U 5/2017

(Continued)

*Primary Examiner* — April G Gonzales
(74) *Attorney, Agent, or Firm* — Muncy, Geissler, Olds & Lowe

(57) ABSTRACT

Provided is a synchronizing mechanism of a hinge of an infolding flexible screen of a mobile terminal. The hinge comprises a left rotating bracket, a right rotating bracket, and a middle mounting frame, wherein the left rotating bracket and the right rotating bracket are respectively connected to the middle mounting frame via a rotating connecting structure, and axes of the left rotating bracket and the right rotating bracket are not on the same line but are parallel to each other, and the synchronizing mechanism comprises a horizontally arranged intermediate gear having an axis perpendicular to the axes of the left rotating bracket and the right rotating bracket, and the left rotating bracket and the right rotating bracket are connected to the intermediate gear via gears or racks, so that the left rotating bracket and the right rotating bracket rotate synchronously and reversely. The position of the intermediate gear is lower than the top of the middle mounting frame. The present invention can change the space occupied by the gear transmission structure in the hinge, and can form a concave reserved space for the bending part of the flexible screen, with good transmission reliability. The present invention is convenient to be arranged under the flexible screen, and is convenient for the thinning design and narrow frame design and application of a mobile terminal having a flexible screen.

10 Claims, 6 Drawing Sheets

(58) Field of Classification Search
USPC .................................................... 455/575.3
See application file for complete search history.

(56) References Cited

U.S. PATENT DOCUMENTS

| | | | | |
|---|---|---|---|---|
| 7,640,044 | B2 * | 12/2009 | Won | G06F 1/165<br>348/333.06 |
| 2003/0040330 | A1 * | 2/2003 | Kim | H04M 1/0216<br>455/550.1 |
| 2012/0149438 | A1 * | 6/2012 | Kwon | H04M 1/022<br>16/248 |
| 2013/0322004 | A1 * | 12/2013 | Park | E05D 3/122<br>16/354 |
| 2015/0102966 | A1 * | 4/2015 | Chiu | H01Q 1/243<br>343/702 |
| 2015/0241925 | A1 * | 8/2015 | Seo | G06F 1/1652<br>361/679.27 |
| 2018/0011515 | A1 * | 1/2018 | Yoo | G06F 1/1652 |
| 2018/0110139 | A1 * | 4/2018 | Seo | G06F 1/1681 |
| 2018/0150107 | A1 * | 5/2018 | Lee | H04M 1/0218 |
| 2018/0224897 | A1 * | 8/2018 | Tucker | E05D 3/122 |
| 2018/0324964 | A1 * | 11/2018 | Yoo | H01Q 1/2266 |
| 2019/0166703 | A1 * | 5/2019 | Kim | G06F 1/1652 |
| 2019/0200470 | A1 * | 6/2019 | Woo | G06F 1/1681 |
| 2020/0117233 | A1 * | 4/2020 | Ou | H04B 1/3827 |
| 2020/0117245 | A1 * | 4/2020 | Ou | H04M 1/0268 |

FOREIGN PATENT DOCUMENTS

| | | | |
|---|---|---|---|
| CN | 207049183 | U | 2/2018 |
| CN | 108468706 | A | 8/2018 |
| CN | 209731301 | U | 12/2019 |
| JP | 2003056545 | A | 2/2003 |

* cited by examiner

SYNCHRONIZING MECHANISM OF HINGE OF INFOLDING FLEXIBLE SCREEN OF MOBILE TERMINAL

FIELD OF THE INVENTION

The present invention relates to a mobile terminal with an infolding flexible screen and a hinge thereof, particularly relates to a synchronizing mechanism applied therein.

BACKGROUND

A flexible screen is an ideal option for mobile terminals, which can be foldable when carrying and can be unfolded to obtain a double display when using, meeting the needs for large-screen display. Since a flexible screen is a continuous screen, it is often necessary to provide a synchronizing mechanism in the hinge so that the left side mechanism and the right side mechanism move synchronously and reversely. However, the synchronizing mechanism often limits the thickness of a mobile terminal with a flexible screen, which is not convenient for the thinning design of a mobile terminal with a flexible screen and even affects the narrow frame design of a mobile terminal.

SUMMARY

The technical problem to be solved by the present invention is to provide a synchronizing mechanism of a hinge of an infolding flexible screen of a mobile terminal, which has a simple structure and can meet the need for the use of a mobile terminal with a flexible screen. To achieve this object, the present invention adopts the following technical solutions:

A synchronizing mechanism of a hinge of an infolding flexible screen of a mobile terminal, wherein the hinge comprises a left rotating bracket, a right rotating bracket and a middle mounting frame, the left rotating bracket and the right rotating bracket are respectively connected to the middle mounting frame via a rotating connecting structure, and axes of the rotation connection of the left rotating bracket and the right rotating bracket are not on the same line but are parallel to each other; the synchronizing mechanism comprises a horizontally arranged intermediate gear having an axis perpendicular to the axes of the left rotating bracket and the right rotating bracket, and the left rotating bracket and the right rotating bracket are connected to the intermediate gear via gears or racks, so that the left rotating bracket and the right rotating bracket rotate synchronously and reversely, the position of the intermediate gear is lower than the top of the middle mounting frame.

On the basis of the foregoing technical solutions, the present invention may further adopt the following technical solutions or a combination of these technical solutions.

The left rotating bracket and the right rotating bracket are connected to the intermediate gear via a left gear and a right gear respectively, axes of the left gear and the right gear are perpendicular to the axis of the intermediate gear, and the left gear and the right gear are respectively located on the left side and the right side of the intermediate gear, the left rotating bracket is not coincident with the axis of the left gear and the right rotating bracket is not coincident with the axis of the right gear.

Both ends of the gear shaft of the left gear and both ends of the gear shaft of the right gear are movably connected to the fixing bracket on the middle mounting frame; the left rotating bracket is connected to the left gear via a left connecting rod to rotate synchronously; and the right rotating bracket is connected to the right gear via a right connecting rod to rotate synchronously.

One end of the left connecting rod is fixedly connected to the side of the gear shaft of the left gear near the left rotating bracket, and the other end is connected to the left rotating bracket through the engagement of a guide pin and a guide groove; one end of the right connecting rod is fixedly connected to the side of the gear shaft of the right gear near the right rotating bracket, and the other end is connected to the right rotating bracket through the engagement of a guide pin and a guide groove.

The synchronizing mechanism is further combined with a torsion mechanism, the torsion mechanism comprises a left reed pipe and a right reed pipe that are respectively clamped and connected with the gear shaft of the left gear and the gear shaft of the right gear, the left reed pipe and the right reed pipe are connected as a whole from the space of the middle mounting frame at the bottom of the horizontally arranged intermediate gear.

The synchronizing mechanism is further combined with a torsion mechanism, and the torsion mechanism comprises a left reed pipe and a right reed pipe; the side of the gear shaft of the left gear that is not connected to the left connecting rod is clamped and connected by the left reed pipe, and the side of the gear shaft of the right gear that is not connected to the right connecting rod is clamped and connected by the right reed pipe, the left reed pipe and the right reed pipe are connected as a whole from the space of the middle mounting frame at the bottom of the horizontally arranged intermediate gear.

The left rotating bracket and the right rotating bracket are connected to the intermediate gear through a first rack and a second rack.

The first rack and the second rack are respectively located on the front and rear sides of the intermediate gear.

The first rack and the second rack are respectively connected to off-axis parts of the left rotating bracket and the right rotating bracket, and when the left rotating bracket and the right rotating bracket rotate in the opposite direction, the first rack and the second rack slide in opposite directions; sliding guide rails of the first rack and the second rack are respectively arranged on the fixing bracket on the middle mounting frame.

The off-axis parts of the left rotating bracket and the right rotating bracket are respectively provided with connecting pins, and the first rack and the second rack are respectively provided with sliding chutes connected with the connecting pins.

With the technical solutions herein, the present invention can change the space occupied by the gear transmission structure in the hinge, and can form a concave reserved space for the bending part of the flexible screen, with good transmission reliability. The present invention is convenient to be arranged under the flexible screen, and is convenient for the thinning design and narrow frame design and application of a mobile terminal having a flexible screen.

DETAILED DESCRIPTION

Figure 1:
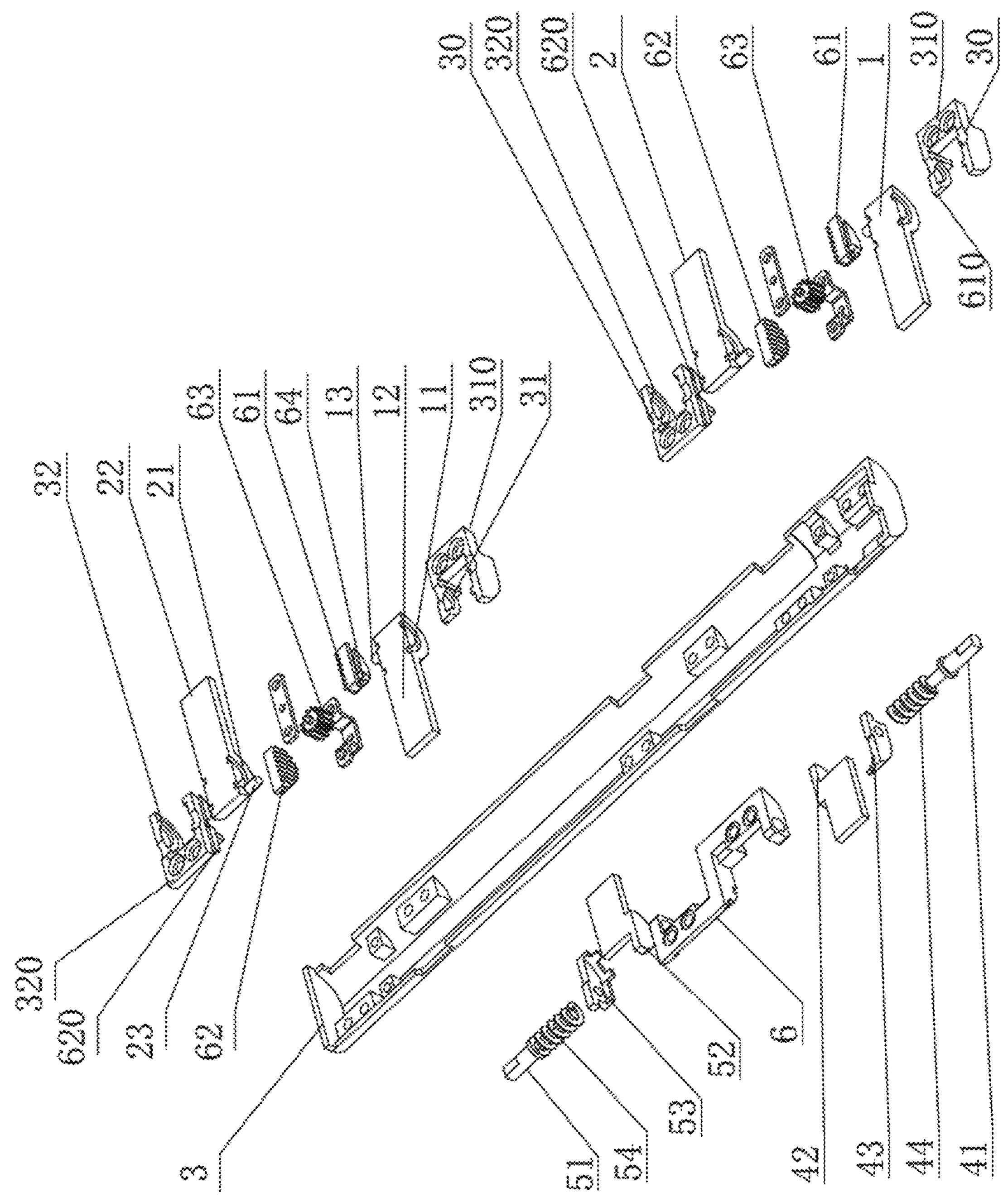
FIG. 1 is an exploded view of an embodiment of a hinge of the present invention.
Figure 3:
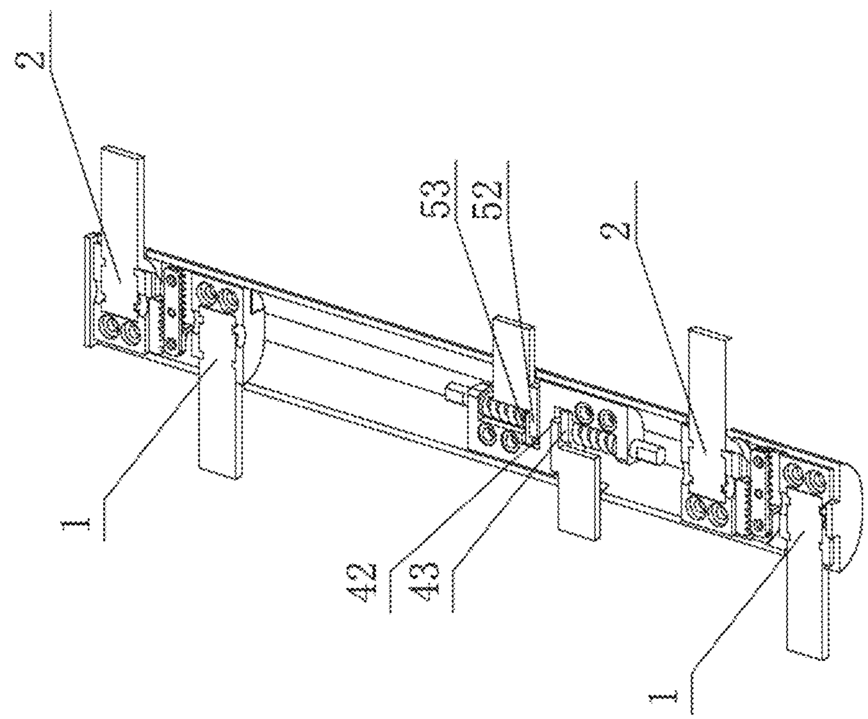
FIG. 2 and FIG. 3 are schematic diagrams showing a hinge when a mobile terminal is folded and unfolded and flattened according to an embodiment of the present invention.
Figure 2:
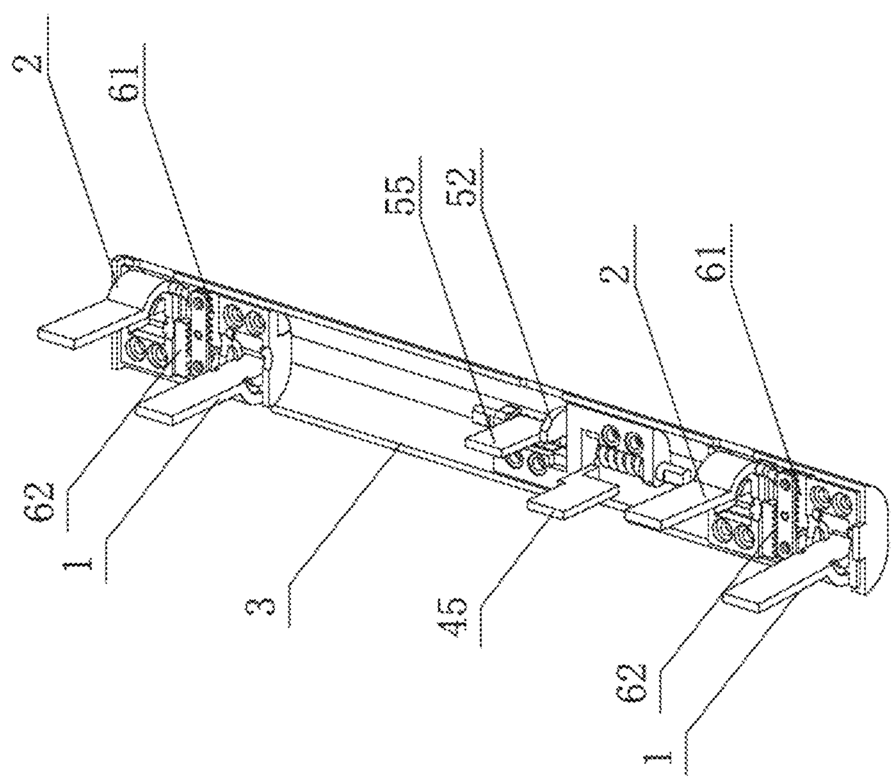
Figure 4:
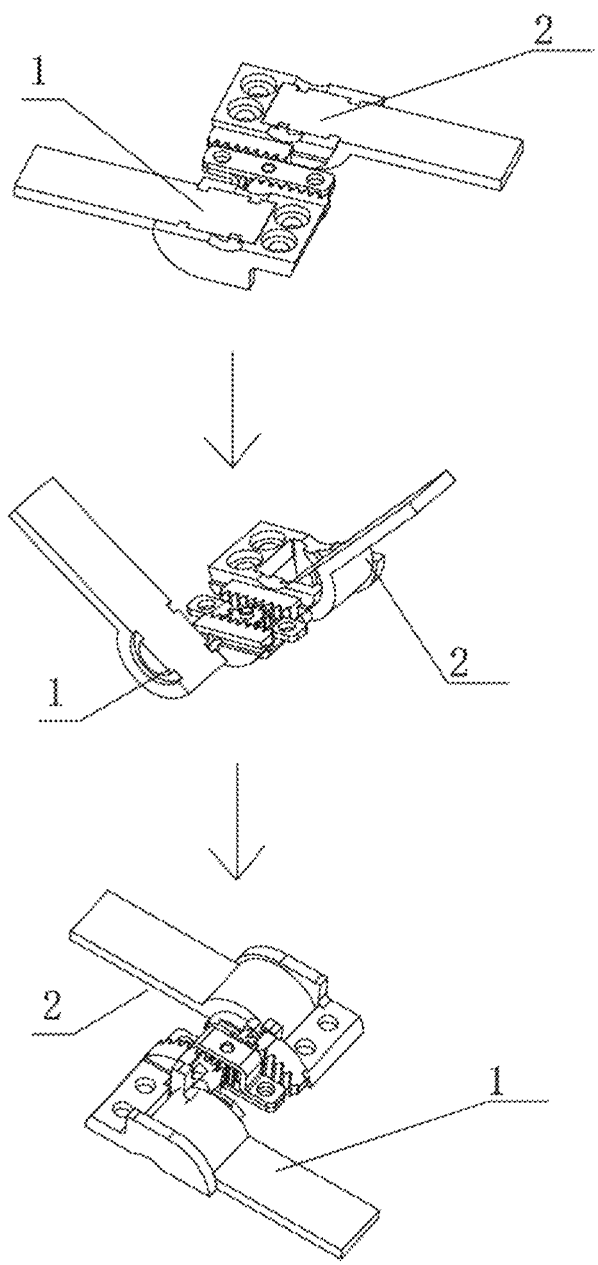
FIG. 4 is a demonstration diagram showing the state changes of a left rotating bracket and a right rotating bracket of a hinge when a mobile terminal is folded and unfolded and flattened according to an embodiment of the present invention.

Referring to the figures, a hinge of an infolding flexible screen of a mobile terminal comprises a left rotating bracket 1, a right rotating bracket 2 and a middle mounting frame 3. The left rotating bracket 1 and the right rotating bracket 2 are respectively connected to the middle mounting frame 3 via the rotating connecting structure, the axis of A1 of the rotation connection of the left rotating bracket 1 and the axis A2 of the rotation connection of the right rotating bracket 2 are not on the same line but are parallel to each other.

The middle mounting frame 3 may be a back shell in the middle of a hinge with a certain strength, in which a structure capable of connecting parts is provided, or may be a skeleton structure with a shielding structure provided on the back side. The middle mounting frame 3 can be provided with a synchronizing mechanism, a torsion mechanism, a rotating connection mechanism, etc. A plurality of rotating connection mechanisms can be mounted on the middle mounting frame 3, and multiple pairs of left rotating bracket 1 and right rotating bracket 2 can be connected along its length direction.

The middle mounting frame 3 is provided with fixing brackets 310 and 320 for the left rotating bracket 1 and the right rotating bracket 2 respectively, and the fixing brackets 310 and 320 are respectively provided with arc-shaped rotating connecting rails 31 and 32 on both sides; the left rotating bracket 1 is provided with a rotating connecting block 11 and an external connecting portion 12 that are slidly connected and engaged with the arc-shaped rotating connecting rails 31 on both sides and are located therebetween; the right rotating bracket 2 is provided with a rotating connecting block 21 and an external connecting portion 22 that are slidly connected and engaged with the arc-shaped rotating connecting rails 32 on both sides and are located therebetween, to facilitate the formation of a reserved space for the middle mounting frame. The external connecting portions 12 and 22 are respectively connected to components that rotate synchronously and in the same direction, for example, the left housing 100 of the mobile terminal and the right housing 200 of the mobile terminal; the left support plate 101 and the right support plate 201 of the flexible screen of the mobile terminal can be respectively connected to the housing on the same side to rotate with the left rotating bracket 1 and the right rotating bracket 2 synchronously and in the same direction, or directly connected to the external connecting portions of the left rotating bracket 1 and the right rotating bracket 2. Other parts that rotate synchronously and in the same direction in the hinge can also be connected to the external connecting portion, for example, the rotating part of the torsion mechanism.

The rotating connecting structure between the left rotating bracket 1 and the right rotating bracket 2 and the middle mounting frame may also be a connecting rod mechanism, etc.

The hinge is provided with a synchronizing mechanism. The left rotating bracket 1 and the right rotating bracket 2 are also connected to the synchronizing mechanism, so that the left rotating bracket 1 and the right rotating bracket 2 rotate synchronously and reversely. The synchronizing mechanism may adopt an engaging connecting structure, which may be formed by connecting a plurality of gears or connecting gears and racks.

In the embodiment shown in FIGS. 1 to 4, the synchronizing mechanism includes a first rack 61 connected to the off-axis portion of the left rotating bracket 1 and a second rack 62 connected to the off-axis portion of the right rotating bracket. A gear 63 is connected between the first rack and the second rack. The gear carrier of the gear 63 and the cover plate are arranged on the middle mounting frame 3, and the sliding guide rails 610 and 620 of the first rack 61 and the second rack 62 can be arranged on the fixing brackets 310 and 320, respectively.

The off-axis portion of the left rotating bracket 1 and the off-axis portion of the right rotating bracket may be provided with connecting pins 13 and 23 respectively, and the first rack 61 and the second rack 62 may be provided with sliding chutes 64 that are connected to the connecting pins 13 and 23 respectively.

The synchronizing mechanism is within the range covered by the flexible screen 300 when the mobile terminal is unfolded and flattened, which facilitates the narrow frame design of a mobile terminal having an infolding flexible screen. The synchronizing mechanism can be arranged in the middle mounting frame 3. The gear 63 is horizontally arranged, and its axis is perpendicular to the axes A1 and A2 of the left rotating bracket and the right rotating bracket, which facilities to provide a reserved space for bending of a flexible screen and meet the thinning design when it is arranged at the bottom of the flexible screen. The positions of rack 61, 62 and the gear 63 that is horizontally arranged are lower than the top of the middle mounting frame 3.

Figure 6:
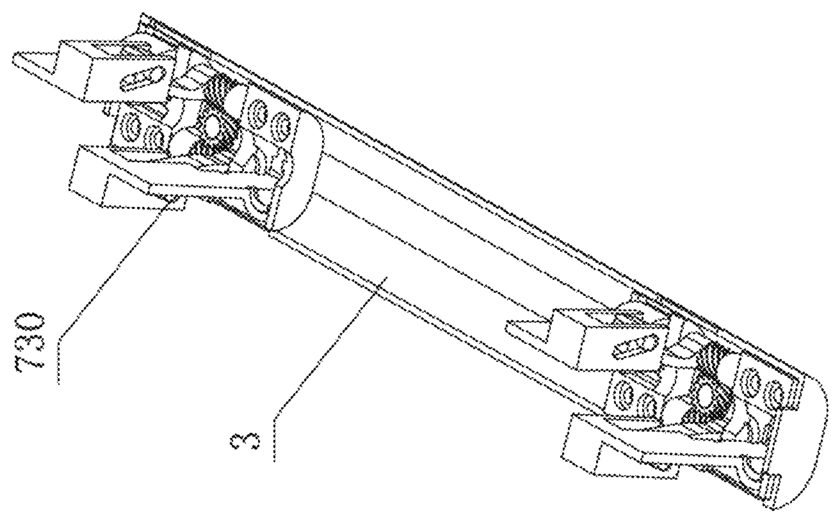
FIG. 6 is a schematic diagram showing a synchronizing mechanism and torsion mechanism of a hinge when a mobile terminal is folded according to another embodiment of the present invention.
Figure 5:
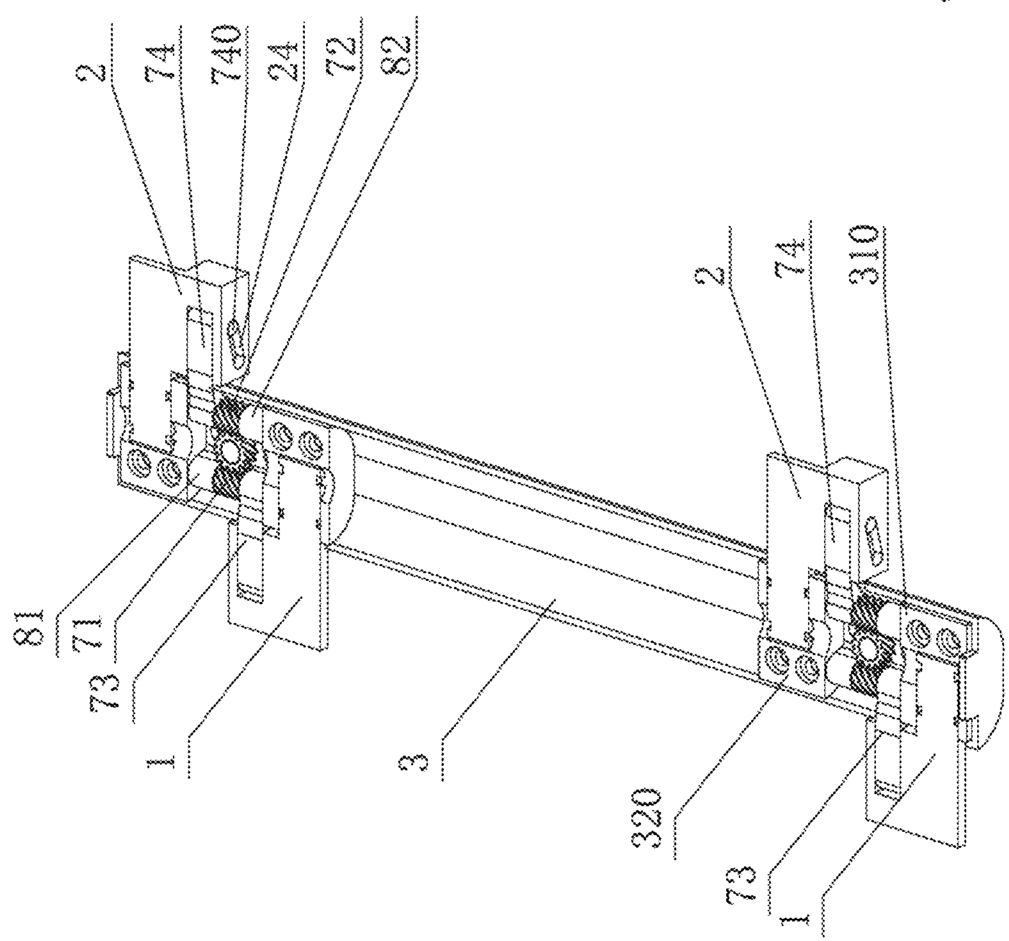
FIG. 5 is a schematic diagram showing a synchronizing mechanism and torsion mechanism of a hinge when a mobile terminal is unfolded and flattened according to another embodiment of the present invention.
Figure 7:
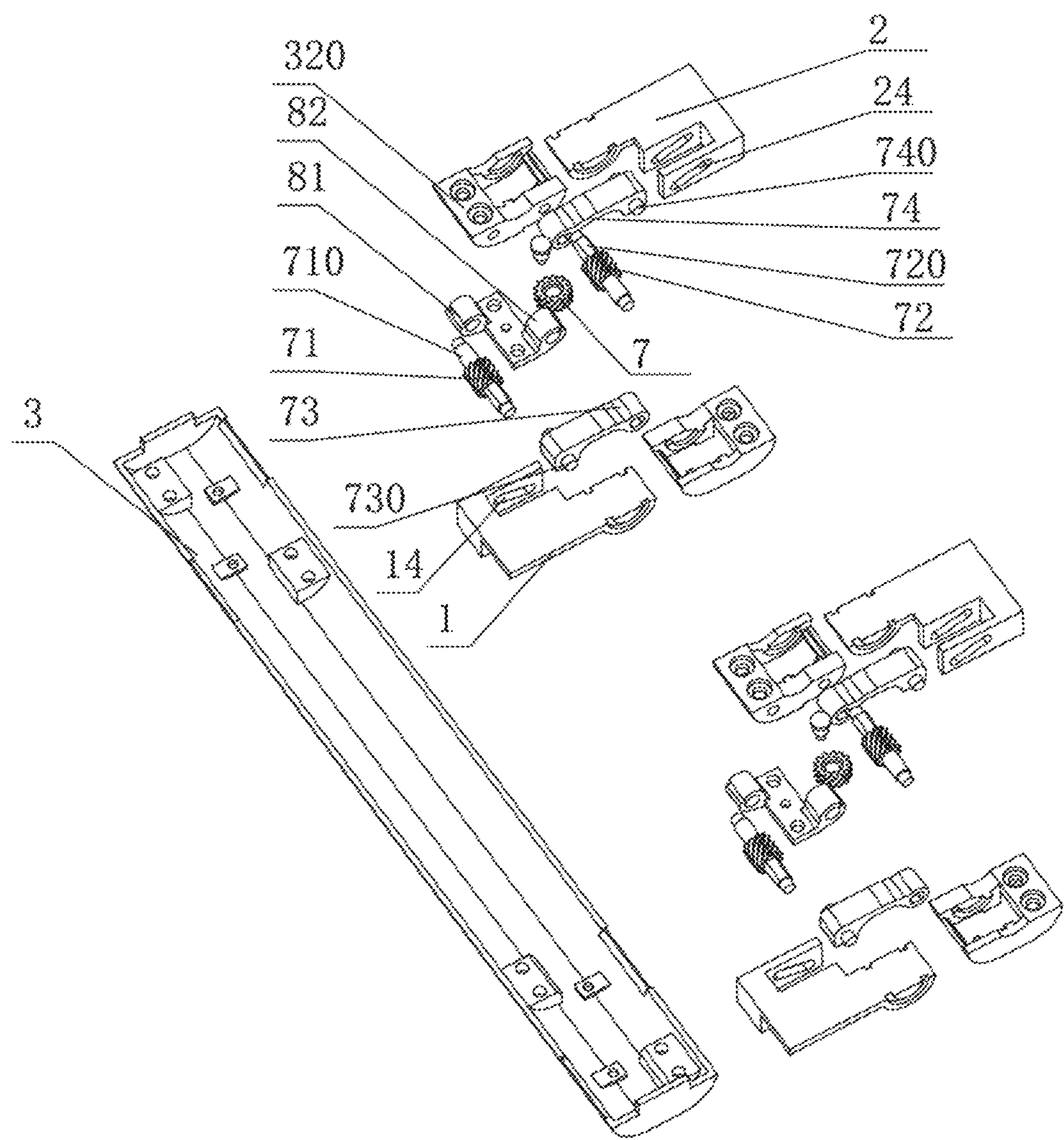
FIG. 7 is an exploded view showing a synchronizing mechanism and torsion mechanism of a hinge of the present invention.
Figure 8:
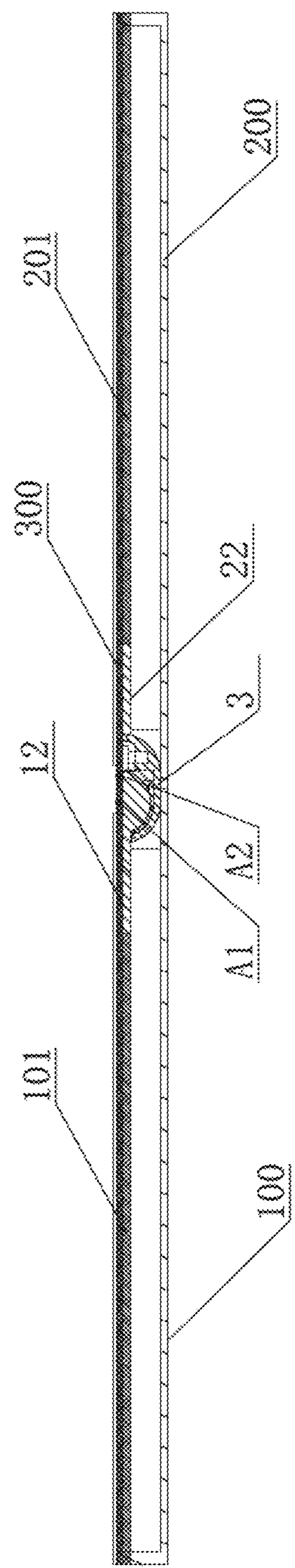
FIG. 8 is a cross-sectional view of a mobile terminal where the left rotating bracket and the right rotating bracket are located when the mobile terminal is unfolded and flattened.

In the embodiment shown in FIGS. 5 to 7, the synchronizing mechanism includes a horizontally arranged intermediate gear 7 having an axis perpendicular to the axes A1 and A2 of the left rotating bracket and the right rotating bracket, and the left rotating bracket and the right rotating bracket are connected to the intermediate gear 7 via gears 71, 72. The position of the intermediate gear 7 is lower than the top of the middle mounting frame.

The axes of the gears 71 and 72 are perpendicular to the axis of the intermediate gear 7, and are respectively located on the front and rear sides of the intermediate gear 7, so that a concave reserved space for bending of the flexible screen is formed between them, which facilitates the thinning design without hindering the effective transmission of the gear.

The left rotating bracket 1 is connected to the gear 71, but their axes do not coincide; the right rotating bracket 2 is connected to the gear 72, but their axes do not coincide.

Both ends of the gear shaft 710 of the gear 71 and the both ends of the gear shaft 720 of the gear 72 are movably connected to the fixing brackets 310 and 320. The left rotating bracket 1 is connected to the gear 71 via the connecting rod 73. One end of the connecting rod is fixedly connected to the side of the gear shaft 710 close to the left rotating bracket, and the other end is connected to the left rotating bracket 1 through the engagement of a guide pin and a guide groove, wherein the left rotating bracket 1 is provided with a guide groove 14, the connecting rod 73 is provided with a guide pin 730; the right rotating bracket 2 is connected to the gear 72 via a connecting rod 74, one end of the connecting rod 74 is fixedly connected with the side of the gear shaft 720 close to the right rotating bracket, and the other end is connected to the right rotating bracket 2 through the engagement of a guide pin and a guide groove, wherein the right rotating bracket 2 is provided with a guide groove 24, and the connecting rod 74 is provided with a guide pin 740.

The hinge is provided with a first torsion mechanism that provides rotation resistance for the left rotating bracket, and a second torsion mechanism that provides rotation resistance for the right rotating bracket, so as to improve the operating feeling and further cooperate to form a function of stopping rotation and positioning at any time. The first torsion mechanism and the second torsion mechanism are within the range covered by the flexible screen 300 when the mobile terminal is unfolded and flattened, and can be arranged on the middle mounting frame.

Referring to FIGS. 1 to 4, the first torsion mechanism includes a shaft 41, a rotating part 42, and a non-rotating part 43. The non-rotating part 43 is pressed against the side of the rotating part 42 by a spring 44 to form a friction fit. The rotation axis of the rotating part 42 of the first torsion mechanism and the axis A1 of the left rotating bracket are on the same straight line.

The second torsion mechanism includes a shaft 51, a rotating part 52, and a non-rotating part 53. The non-rotating part 53 is pressed against the side of the rotating part 52 by a spring 54 to form a friction fit. The rotation axis of the rotating part 52 of the second torsion mechanism and the axis A2 of the right rotating bracket are on the same straight line.

A mounting frame 6 of the torsion mechanism is provided on the middle mounting frame 3, the shafts 41, 51 are connected to the mounting frame 6 of the torsion mechanism. The spring 44 and the spring 54 are respectively sleeved on the shafts 41, 51, and the non-rotating parts 43, 53 are restricted by an anti-rotation structure and cannot rotate.

The rotating parts 42, 52 of the torsion structure are provided with external connection portions 45, 55 for connecting to the rotating bracket or the flexible screen support plate, so that it works with the flexible screen support plate together as synchronous and homodromous rotating part of the rotating bracket on each side. A guiding structure for the rotation of the rotating part can be provided on the non-rotating parts 43, 53 or the mounting frame 6.

For the mode of execution of the synchronizing mechanism of FIGS. 5 to 7, it can be combined with the torsion mechanism. The side of the gear shaft 710 that is not connected to the connecting rod 73 can be connected to the reed pipe 81 to function as the first torsion mechanism, and the side of the gear shaft 720 that is not connected to the connecting rod 74 can be connected to the reed pipe 82 to function as the second torsion mechanism. The reed pipe 81 of the first torsion mechanism and the reed pipe 82 of the second torsion mechanism can be connected as whole in the space of middle mounting frame at the bottom of the horizontally arranged intermediate gear 7 while keeping it from rotating.

When the mobile terminal enters the folded state, the left rotating bracket 1 between the flexible screen 300 and the middle mounting frame 3 and the parts that synchronically rotate in the same direction with the left rotating bracket (the rotating part of the first torsion mechanism, the left flexible screen support plate 101), the right rotating bracket and the parts that synchronically rotate in the same direction with the right rotating bracket (the rotating part of the second torsion mechanism, the right flexible screen support plate 201) rotate in opposite directions to both sides respectively, and inner ends 102 and 202 of the left flexible screen support plate and the right flexible screen support plate also rotate into the middle mounting frame, and the middle groove area 30 of the middle mounting frame 3 provides a reserved space for the bending part of the flexible screen 300.

The above descriptions are only specific embodiments of the present invention, rather than limiting the structural features of the present invention. Any changes or modifications made by those skilled in the art shall fall within the scope of protection of the present invention.

The invention claimed is:

1. A synchronizing mechanism of a hinge of an infolding flexible screen of a mobile terminal, wherein the hinge comprises a left rotating bracket, a right rotating bracket and a middle mounting frame, the left rotating bracket and the right rotating bracket are respectively connected to the middle mounting frame via a rotating connecting structure, and axes of the rotation connection of the left rotating bracket and the right rotating bracket are not on the same line but are parallel to each other; the synchronizing mechanism comprises a horizontally arranged intermediate gear having an axis perpendicular to the axes of the left rotating bracket and the right rotating bracket, and the left rotating bracket and the right rotating bracket are connected to the intermediate gear via gears or racks, so that the left rotating bracket and the right rotating bracket rotate synchronously and reversely, the position of the intermediate gear is lower than the top of the middle mounting frame.

2. The synchronizing mechanism of a hinge of an infolding flexible screen of a mobile terminal according to claim 1, wherein the left rotating bracket and the right rotating bracket are connected to the intermediate gear via a left gear and a right gear respectively, axes of the left gear and the right gear are perpendicular to the axis of the intermediate gear, and the left gear and the right gear are respectively located on the left side and the right side of the intermediate gear, the left rotating bracket is not coincident with the axis of the left gear and the right rotating bracket is not coincident with the axis of the right gear.

3. The synchronizing mechanism of a hinge of an infolding flexible screen of a mobile terminal according to claim 2, wherein both ends of the gear shaft of the left gear and both ends of the gear shaft of the right gear are movably connected to the fixing bracket on the middle mounting frame; the left rotating bracket is connected to the left gear via a left connecting rod to rotate synchronously; and the right rotating bracket is connected to the right gear via a right connecting rod to rotate synchronously.

4. The synchronizing mechanism of a hinge of an infolding flexible screen of a mobile terminal according to claim 3, wherein one end of the left connecting rod is fixedly connected to the side of the gear shaft of the left gear near the left rotating bracket, and the other end is connected to the left rotating bracket through the engagement of a guide pin and a guide groove; one end of the right connecting rod is fixedly connected to the side of the gear shaft of the right gear near the right rotating bracket, and the other end is connected to the right rotating bracket through the engagement of a guide pin and a guide groove.

5. The synchronizing mechanism of a hinge of an infolding flexible screen of a mobile terminal according to claim 4, wherein the synchronizing mechanism is further combined with a torsion mechanism, and the torsion mechanism comprises a left reed pipe and a right reed pipe;

the side of the gear shaft of the left gear that is not connected to the left connecting rod is clamped and connected by the left reed pipe, and the side of the gear shaft of the right gear that is not connected to the right connecting rod is clamped and connected by the right reed pipe, the left reed pipe and the right reed pipe are connected as a whole from the space of the middle mounting frame at the bottom of the horizontally arranged intermediate gear.

6. The synchronizing mechanism of a hinge of an infolding flexible screen of a mobile terminal according to claim 2, wherein the synchronizing mechanism is further combined with a torsion mechanism, the torsion mechanism comprises a left reed pipe and a right reed pipe that are respectively clamped and connected with the gear shaft of the left gear and the gear shaft of the right gear, the left reed pipe and the right reed pipe are connected as a whole from the space of the middle mounting frame at the bottom of the horizontally arranged intermediate gear.

7. The synchronizing mechanism of a hinge of an infolding flexible screen of a mobile terminal according to claim 1, wherein the left rotating bracket and the right rotating bracket are connected to the intermediate gear through a first rack and a second rack.

8. The synchronizing mechanism of a hinge of an infolding flexible screen of a mobile terminal according to claim 7, wherein the first rack and the second rack are respectively located on the front and rear sides of the intermediate gear.

9. The synchronizing mechanism of a hinge of an infolding flexible screen of a mobile terminal according to claim 7, wherein the first rack and the second rack are respectively connected to off-axis parts of the left rotating bracket and the right rotating bracket, and when the left rotating bracket and the right rotating bracket rotate in the opposite direction, the first rack and the second rack slide in opposite directions; sliding guide rails of the first rack and the second rack are respectively arranged on the fixing bracket on the middle mounting frame.

10. The synchronizing mechanism of a hinge of an infolding flexible screen of a mobile terminal according to claim 9, wherein the off-axis parts of the left rotating bracket and the right rotating bracket are respectively provided with connecting pins, and the first rack and the second rack are respectively provided with sliding chutes connected with the connecting pins.

* * * * *